UNITED STATES PATENT OFFICE.

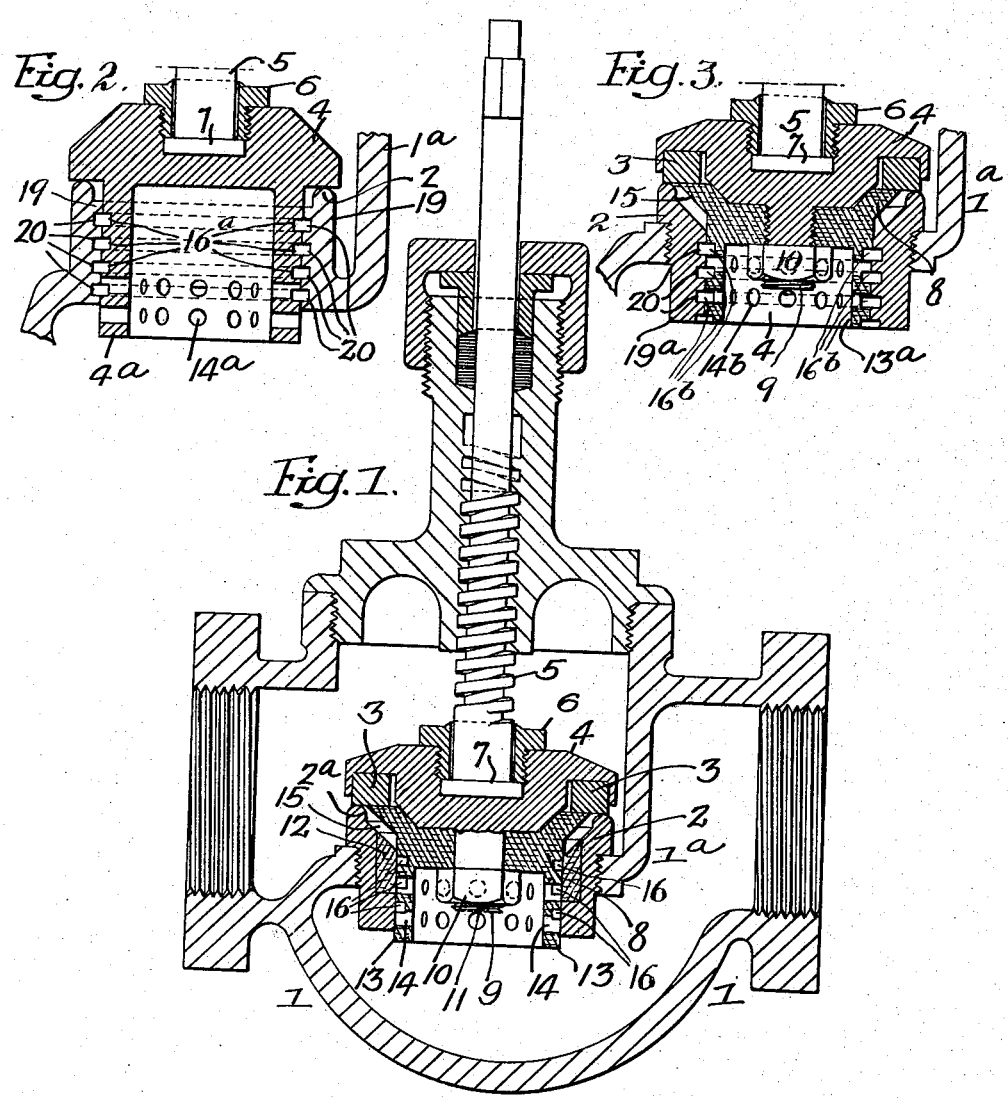

PHILIP ECKENROTH, OF PHILADELPHIA, PENNSYLVANIA, ASSIGNOR OF SIX TWENTY-FIFTHS TO WILBUR F. HAMILTON, OF CYNWYD, PENNSYLVANIA, AND SIX TWENTY-FIFTHS TO FRANK J. MILON, OF WILLIAM PENN, PENNSYLVANIA.

VALVE.

1,217,726.      Specification of Letters Patent.      Patented Feb. 27, 1917.

Application filed January 31, 1913. Serial No. 745,420.

*To all whom it may concern:*

Be it known that I, PHILIP ECKENROTH, a citizen of the United States, residing in Philadelphia, Pennsylvania, have invented certain Improvements in Valves, of which the following is a specification.

The object of my invention is to provide a valve with means designed to prevent the cutting of the seat by the wire-drawing of steam or liquid under high pressures.

My present invention while comprising the provision of auxiliary seats adjacent the main seat, over which the steam or liquid under pressure must pass before it passes the main seat, includes certain improvements in said auxiliary seats. In the present construction, space is provided between the auxiliary seats and the main seat for the expansion of the initial body of steam or liquid leaking by said auxiliary seats so that in passing the main seat, it will be in sufficient volume to avoid cutting of the latter, and my invention also includes certain improved details of improvement over a companion case filed January 31, 1913, Serial No. 745,419. My present arrangement is designed to provide a structure in which the auxiliary seats are relieved to a certain extent of the danger of wear and cutting by the wire-drawing of the steam.

These and other features of my invention are more fully described hereinafter, reference being had to the accompanying drawings, in which:

Figure 1, is a sectional elevation of a valve having and containing the improvements forming the subject of my invention, and Figs. 2 and 3, are detached views of the valve and its seat, showing modified constructions within the scope of my invention.

While my present invention has been applied to what is known as a "globe" valve, it will be understood that its use is not limited to employment with such structures, and with modifications obvious to any one skilled in the art, my improvements may be applied to valves of any description.

In the structure shown in Fig. 1, 1 represents the shell or casing of the valve having the usual diaphragm or division wall 1ª which, in the present instance, is provided with a removable seat 2, engaged by a packing disk or ring 3 of a valve body 4, carried by a stem 5; said stem being retained in place by a threaded collar 6 of usual form engaging a head 7 on the end of said stem. In the present instance, the packing disk or ring 3 is held in place by a member 8, which forms one of the auxiliary seats, which member is passed over a threaded stem 9, and retained by a nut 10 carried thereby; said nut being held against movement by a cotter pin 11 extending through the same. These latter parts may be of the usual construction.

In the present construction, I recess the inner wall of the seat 2, and provide the same with a ring 12 of suitable material, which may be metal or any suitable composition available for the purpose, having a truly annular wall, with which engages the depending annular wall 13 of the member 8; the latter being of the same material as the ring 12. The annular wall 13 is perforated at 14, and steam or other liquid to pass the main seat must pass through these perforations; said wall serving additionally as a baffle to cut down the pressure. This depending portion fits within the ring 12 carried by the seat, forming a substantially fluid-tight joint. The seat itself is provided with an annular wall 2ª with a rounded upper edge forming the seat proper, indicated at 2, and from a point below said upper edge the body of the seat slopes inwardly, as clearly indicated, substantially parallel to the taper or bevel of the member 8, securing the packing ring 3 to the valve. The upper edge of the ring 12 also follows this bevel. By this means, a space 15 is provided in which any steam or other fluid leaking past the auxiliary seat formed by the ring 12 and the sleeve wall 13 may enter and expand so that when the packing ring of the valve is raised from said seat 2 the steam, instead of wire-drawing and cutting said seat, will not pass the same in any appreciable quantity until the valve is lifted entirely clear of said seat. Practically all of the steam or liquid passing the auxiliary seats will go through the perforations so that the contacting surfaces of ring 12 and wall 13 will not suffer by the wire-drawing of the passing bodies of fluid. In addition, the wall 13 is grooved at 16 so that the pressure of steam, or other liquid passing through the perforations 14 will tend to equalize.

In the structure shown in Fig. 2, the valve body is provided with a depending portion 4ª which may be integral therewith and is grooved at 16ª and lies adjacent a wall 19 below the main seat 2, which wall is also grooved at 20. The depending portion 4ª of the valve is perforated at 14ª. Any steam or liquid trapped by the grooves will be gradually admitted to the space between the valve and seat as the valve is lifted, while the main volume passes through the perforations.

The structure shown in Fig. 3, is substantially the same as that shown in Fig. 1, excepting that the wall 19ª of the main seat 2 is grooved at 20ª; the ring 12 being omitted, while the depending portion 13ª of the member 8 is also grooved at 16ᵇ in addition to its perforations 14ᵇ.

It will be seen from this construction that the auxiliary seats while subject to possible wear, can be readily renewed and that the main seat of the valve is absolutely prevented from cutting or damage due to wire-drawing of the steam or any liquid under pressure. In addition, the renewable auxiliary seats are partially protected by the passage of the steam through the perforated walls.

This design of valve is best suited for high pressures, requiring more movement of disk away from seat for a given pressure; pressure being gradually built up, and areas of opening increased by bringing suitably arranged openings past top of seat ring 12, and at the same time removing valve disk 3 away from valve seat 2, preventing cutting of their surfaces. Also for throttling supply of steam; the cutting of material taking place at upper edge of ring 12 and openings, as shown, in place of face of seat 2 and disk 3 as in ordinary globe valve construction, which mean their rapid destruction.

The object of this design of globe valve is to practically stop all flow of steam or fluid through same during the operation of opening and closing of valve; therefore eleminating all cutting of valve seat and valve disks.

I claim:

1. The combination, in a valve structure, of a main valve, a seat therefor, a removable auxiliary seat carried by the main seat and disposed below the latter and constituting one engaging surface, and a detachable perforated sleeve for engagement with said auxiliary seat and constituting a second engaging surface, one of said surfaces being provided with annular grooves.

2. The combination, in a valve structure, of a main valve, a seat therefor, packing carried by said main valve, a removable auxiliary seat carried by the main seat and disposed below the latter and constituting one engaging surface, a detachable perforated sleeve for engagement with said auxiliary seat and constituting a second engaging surface, one of said surfaces being provided with annular grooves, said detachable sleeve engaging the packing ring of the main valve, and means for securing said sleeve in place.

3. The combination, in a valve structure, of a main valve, a packing ring carried thereby, a seat therefor, an auxiliary seat, and a perforated sleeve for peripheral engagement therewith carried by the main valve, said perforated sleeve having annular grooves adjacent the surface of said auxiliary seat.

4. The combination, in a valve structure, of a main valve, a packing ring carried thereby, a seat therefor, a removable auxiliary seat below the main seat, and a renewable perforated sleeve for peripheral engagement therewith carried by and movable with the main valve, said perforated sleeve having annular grooves adjacent the surface of said auxiliary seat.

5. The combination, in a valve structure, of a main valve, a packing ring carried thereby, a seat therefor, an auxiliary seat disposed below the main seat, and an auxiliary valve for peripheral engagement therewith carried by the main valve, one of said auxiliary members having annular grooves in its active meeting face.

6. The combination, in a valve structure, of a main valve, a seat therefor, a separable auxiliary seat carried by the main seat below the latter, a detachable member having a depending wall forming another valve for engagement with said auxiliary seat, one of said latter elements being peripherally grooved, and means for securing said depending wall member to the main valve.

7. The combination, in a valve structure, of a main valve, a seat therefor, a removable auxiliary seat carried by the main seat, and a removable member for engagement with said auxiliary seat, one of said latter elements being annularly grooved.

In testimony whereof, I have signed my name to this specification, in the presence of two subscribing witnesses.

PHILIP ECKENROTH.

Witnesses:
  MURRAY C. BOYER,
  JOS. H. KLEIN.